(12) United States Patent
Davidoff

(10) Patent No.: US 9,378,462 B2
(45) Date of Patent: Jun. 28, 2016

(54) PROBABILITY MAPPING SYSTEM

(75) Inventor: Andrew J. Davidoff, Bangkok (TH)

(73) Assignee: Questor Capital Holdings Ltd., Singapore (SG)

( * ) Notice: Subject to any disclaimer, the term of this patent is extended or adjusted under 35 U.S.C. 154(b) by 212 days.

(21) Appl. No.: 13/585,916

(22) Filed: Aug. 15, 2012

(65) Prior Publication Data
US 2014/0052687 A1    Feb. 20, 2014

(51) Int. Cl.
G06N 5/02    (2006.01)
G06N 7/00    (2006.01)

(52) U.S. Cl.
CPC .... *G06N 7/005* (2013.01); *G06N 5/02* (2013.01); *G06N 7/00* (2013.01)

(58) Field of Classification Search
None
See application file for complete search history.

(56) References Cited

U.S. PATENT DOCUMENTS

| 5,012,675 | A | 5/1991 | Koller et al. |
| 5,781,704 | A | 7/1998 | Rossmo |
| 6,052,651 | A | 4/2000 | Fournier |
| 6,446,006 | B1 | 9/2002 | Thore |
| 7,286,939 | B2 | 10/2007 | Bachrach et al. |
| 7,292,241 | B2 | 11/2007 | Thore et al. |
| 7,869,955 | B2 | 1/2011 | Zhang et al. |
| 8,064,287 | B2 | 11/2011 | Harris et al. |
| 8,090,555 | B2 | 1/2012 | Dai et al. |
| 2005/0171700 | A1 | 8/2005 | Dean |
| 2009/0119082 | A1 | 5/2009 | Fitzpatrick et al. |
| 2009/0306895 | A1 | 12/2009 | MacGregor et al. |
| 2010/0158332 | A1 | 6/2010 | Rico et al. |
| 2011/0119040 | A1 | 5/2011 | McLennan |
| 2011/0125469 | A1 | 5/2011 | Da Veiga et al. |
| 2011/0125476 | A1 | 5/2011 | Craig |
| 2011/0153285 | A1 | 6/2011 | Da Veiga et al. |
| 2011/0172976 | A1 | 7/2011 | Budiman et al. |
| 2011/0231164 | A1 | 9/2011 | Zhang et al. |

FOREIGN PATENT DOCUMENTS

| EP | 0354716 A1 | 2/1990 |
| KR | 10-2012-0060458 | 6/2012 |
| WO | WO 2008/129506 A1 | 10/2008 |
| WO | WO 2012/012768 A1 | 1/2012 |

OTHER PUBLICATIONS

Blyth, et al., Training Material: Spatial Analysis and Modeling, Civil Servants Learning Programme, Distance Learning of Geographic Information Infrastructure, 2008, pp. 1-191.*
PCT International Search Report and Written Opinion for International Application No. PCT/IB2013/001999, dated Feb. 25, 2014 (11 pgs.).

* cited by examiner

*Primary Examiner* — Wilbert L Starks
(74) *Attorney, Agent, or Firm* — Finnegan, Henderson, Farabow, Garrett & Dunner LLP

(57) ABSTRACT

A processor-based system for generating a probability map may include at least one processor. The at least one processor may be configured to receive data associated with a quantity to be mapped and apply a processor-based mapping algorithm to generate a first map of values for the quantity within an area of interest. The processor may also be configured to modify at least one or more of data provided as input to the mapping algorithm or one or more input parameters associated with the mapping algorithm and generate at least a second map of values for the quantity within the area of interest; and generate a probability map associated with the quantity based on the first and second maps.

32 Claims, 9 Drawing Sheets

PROBABILITY MAPPING SYSTEM

TECHNICAL FIELD

The presently disclosed embodiments relate generally to systems and methods for generating data maps. More specifically, the presently disclosed embodiments may include systems and methods for quantitatively generating probability maps relating to quantities in an area of interest.

BACKGROUND

Many industries have an interest in mapping values for a particular quantity over an area of interest. Such maps may aid in performing tasks associated with the industry. For example, maps showing water depths are important in maritime shipping and navigation. Contour maps showing land elevations may be used in planning communities, building roads, constructing reservoirs, etc. In the oil and gas exploration industry, maps showing the locations of oil deposits can help in deciding where and whether to initiate a drilling project. Maps of soil contamination levels can be used in clean up or treatment efforts.

The accuracy of such maps over an area of interest can be crucial. For example, in the oil and gas exploration industry, reliance on a map inaccurately suggesting the presence of oil and gas deposits may have significant negative consequences. All costs associated with equipment, personnel, and operations would be lost if drilling operations were established at a location mapped as having high oil concentration levels only to later discover through drilling that little oil was present at that location. Similar economic consequences may be realized in other industries that depend on mapped data.

In certain situations, creating accurate maps can be challenging. For some quantities, such as elevation, temperature, etc., measurement of particular values over an entire area of interest may be readily ascertainable using scanning measurement equipment to generate contour maps. Even in these situations, however, obtaining a desired level of precision in the measured data and in the coverage of data over the area of interest may be complex. In other cases, it may be difficult or impossible with known techniques to obtain a data scan over an entire area of interest. For example, oil or gas deposits may reside within stone layers or formations located deep below the Earth's surface. Determining the thickness of these stone layers may require drilling in several finite locations to determine the particular thickness values for the stone layer at those locations. Often it may be possible or practical to obtain measurements at a relatively small number of sample sites within an area of interest. As a result, data relating to a particular quantity of interest may be available for only a finite number of sample locations within the area of interest.

Generating a contour map of a particular quantity over an area of interest requires data corresponding to the values for that quantity over the area of interest. Where measured data is available for only a finite set of locations within the area of interest, a process of data extrapolation or projection is required to obtain calculated (estimated) data values to fill in the gaps between locations corresponding to the measured values. Various gridding techniques and extrapolation or estimation algorithms may be employed to calculate data values to supplement measured data within an area of interest. Often, such techniques involve averaging techniques to calculate predicted data values in the areas surrounding the measured values.

In addition to contour maps showing the measured and predicted data values over an area of interest, similar maps may be generated to map probabilities associated with the measured and predicted data values. For example, such probability maps may provide contours of percentages. In some cases, the percentages may be indicative of the likelihood that a particular quantity exceeds a certain value within the area of interest. Returning to the oil and gas example, a probability map may indicate over the area of interest the probability that a sub-surface oil-containing formation has a thickness greater than a predetermined value (e.g., 10 feet or any other thickness of interest).

While such probability maps can be useful in decision making (e.g., deciding where and whether to establish an oil or gas drilling operation), the current methods of generating such probability maps have several drawbacks that can lead to probability maps that have much higher levels of uncertainty than the mapped probabilities suggest. For example, any single map (or grid) generated using a specific gridding algorithm and a specific set of input parameters may look different (sometimes substantially different) from other maps generated with either different algorithms and/or different input parameters. Other than empirical measurement for all points on the map, there is no way to determine which of the generated maps is correct. In fact, none of the generated maps is likely correct, as each merely represents a single possibility. Only by generating a statistically significant number of maps with a statistically reasonable range of parameters can one arrive at a statistically valid interpolation between known data points.

Second, many known techniques for generating probability and statistical maps are based on locally calculated statistics which are then mapped. To the extent that many (if not all) gridding and mapping algorithms constitute some form of averaging tool, such an approach can be mathematically flawed, as average probabilities generated from averaged values would involve taking an average of a set of averages and/or a standard deviation of a set of standard deviations. There is a need for methods and systems for generating more robust probability maps.

SUMMARY

A processor-based system for generating a probability map may include at least one processor. The at least one processor may be configured to receive data associated with a quantity to be mapped and apply a processor-based mapping algorithm to generate a first map of values for the quantity within an area of interest. The processor may also be configured to modify at least one or more of data provided as input to the mapping algorithm or one or more input parameters associated with the mapping algorithm and generate at least a second map of values for the quantity within the area of interest; and generate a probability map associated with the quantity based on the first and second maps.

A computer readable storage medium having computer readable program code embodied in the medium for use by a processor-based system in generating a probability map may include program code configured to receive data associated with a quantity to be mapped. The program code may also be configured to apply a processor-based mapping algorithm to generate a first map of values for the quantity within an area of interest; modify at least one or more of data provided as input to the mapping algorithm or one or more input parameters associated with the mapping algorithm and generate at least a second map of values for the quantity within the area of interest; and generate a probability map associated with the quantity based on the first and second maps.

A method of generating a probability map may include receiving data associated with a quantity to be mapped and applying a processor-based mapping algorithm to generate a first map of values for the quantity within an area of interest. The method may also include modifying at least one or more of data provided as input to the mapping algorithm or one or more input parameter associated with the mapping algorithm and generating at least a second map of values for the quantity within the area of interest; and generating a probability map associated with the quantity based on the first and second maps.

DETAILED DESCRIPTION

The presently disclosed systems and methods may involve the use of Stochastic/Monte-Carlo techniques in the mapping of discrete spatially varying data or spatially varying probability functions. Using such techniques may yield statistically robust probability maps and other statistical maps, including, for example, statistical maps of the mean, median, mode, range, deviation, standard deviation, etc. of a quantity over an area of interest. The systems and methods of the presently disclosed embodiments may be applicable to the mapping of any data that can be displayed in a geographic information system, including but not limited to geologic, geophysical, reservoir engineering, mining, meteorological, oceanographic, and environmental data, among others. Other data types that may be used may include geographic, topographic, bathometric, petrophysical, atmospheric, hydrologic, pedologic (soil), chemical, sociologic, economic, biologic, zoological, botanical, epidemiologic, political, ecologic, etc. Such data may include, for example, values associated with quantities such as thickness, elevation, net to gross ratios, porosity, permeability, water saturation, hydrocarbon saturation, mineral percentage, pollution level, contamination level, temperature, depth, salinity, rainfall level, wind speed, humidity, etc. Further, the disclosed techniques are not limited to two or three dimensional space, but can be expanded to phenomena that vary over time (four dimensional spaces) or even to conceptual multi-dimensional spaces.

Figure 1:
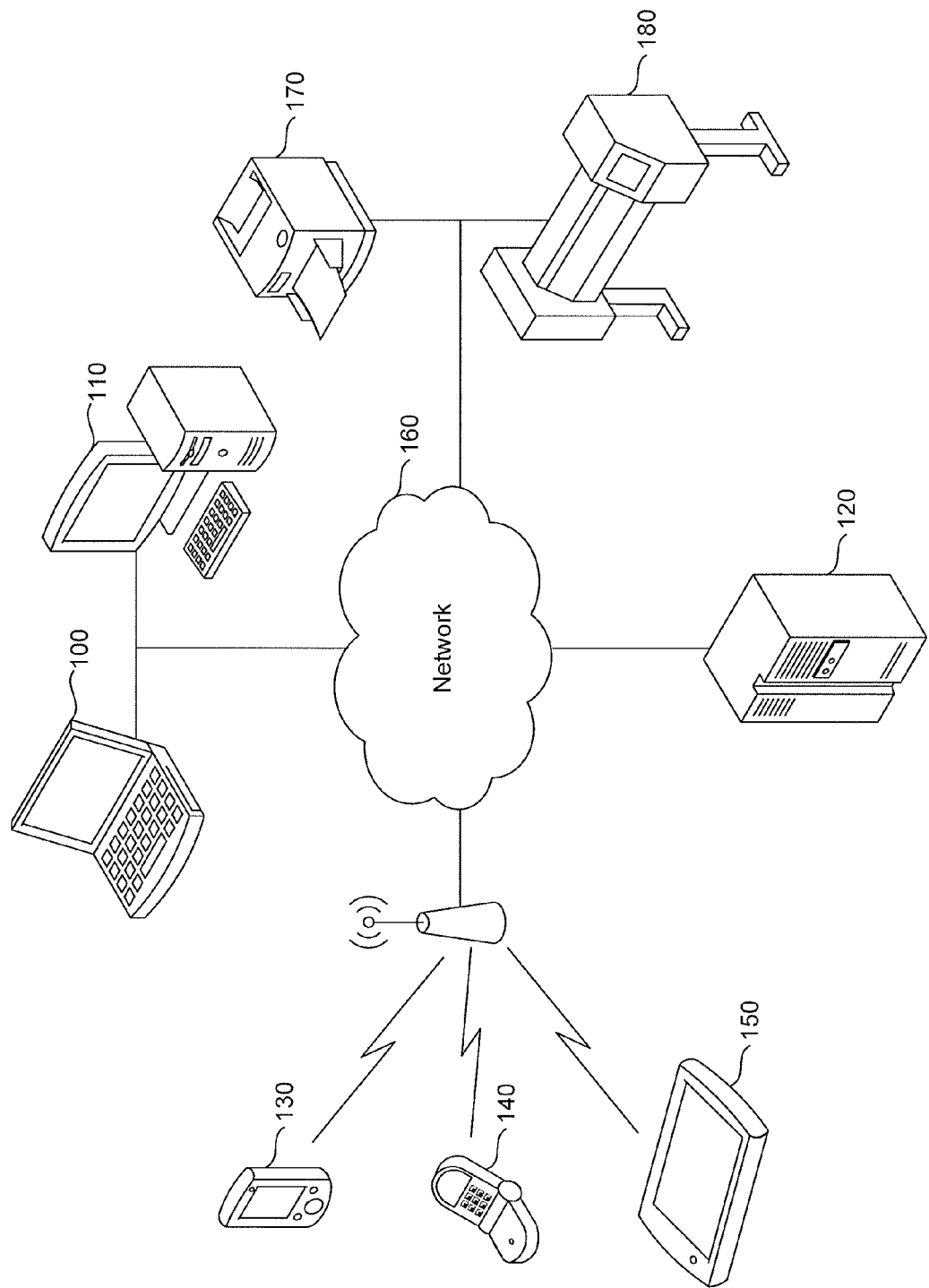
FIG. 1 is a diagrammatic representation of devices and systems that may be used to implement the probability mapping system and method, according to the exemplary disclosed embodiments.

FIG. 1 provides a diagrammatic illustration of various devices, systems, and components consistent with the presently disclosed embodiments. For example, systems and devices that may be configured to generate and/or display the disclosed probability maps may include processor-based devices, such as a laptop computer 100, a desktop computer system 110, a mainframe server 120, smart phone 130, cell phone 140, tablet computer 150, etc. Each may include one or more processors or processing units configured to perform various operations associated with generation of the disclosed probability maps. Such processors may include, for example, central processing units, digital signal processors, applications processors, embedded processors, or any other logic-based device configured to execute instructions.

Systems for generating the presently disclosed probability maps may be compatible with various operating systems, such as Windows, Mac, Linux, Unix, etc. A probability map generating system consistent with the presently disclosed embodiments may include any software applications, software components, computing systems, hardware components, etc. that may participate in the process of generating a probability map. In some cases, a probability map generating system may include a stand-alone computer including probability map generating software. In other embodiments, the system may include a processor having access to instructions associated with probability map-generating software.

In still other embodiments, the probability map generating systems may include processors configured to run applications that access features provided by separate probability map-generating code. That is, probability map generating systems may include software, which may function as a stand-alone software package or that may be incorporated into other software packages as an "add on" or as an embedded component. For example, software configured to generate the disclosed probability maps may be included with industry standard geographic information system (GIS) mapping packages. In the oil and gas industry, such packages may include ArcView, Petrel, Kingdom, Zmap, CPS3, etc. Other similar software packages may be used in other industries such as meteorology, oceanography, geography, environmental sciences, etc. Software configured to generate the disclosed probability maps may also be incorporated into or used with generalized packages, such as Google Earth and Google Maps.

Any or all examples of such devices may be connected over various networks 160, such as local or wide area networks, the Internet, etc. Various devices may be employed to generate or display the disclosed probability maps. Such devices may include display screens associated with laptop 100, desktop 110, and devices 130, 140, and/or 150. Such devices may also include networked of Internet televisions, a printer 170, a plotter 180, or any other devices for generating and/or displaying mapped probability data.

The presently disclosed systems and methods may generate probability maps based on any suitable input data. In some embodiments, the data input to the mapping system may include discrete data, which may be described as X, Y, Z, where the X and Y data points provide a geographic reference (e.g., a location within an area of interest), and Z represents the parameter under investigation. Such, X and Y terms may include geographic references from a latitude and longitude based system or from any other suitable cartographic projection system such as, for example, Universal Transverse Mercator (UTM), U.S. State Plane Systems; international cartographic projections, etc.

In other embodiments, the data input to the probability map generating system may include data in the form of probability distributions. In such cases, the input data could be represented either as: (X, Y, T, A, B) or (X, Y, T, A, B, C). Here, the X and Y variables also provide a geographic location within an area of interest, as described above. In either case, the "T" value may correspond to an identifier that specifies the type of probability distribution. Such probability distribution types may include, for example, normal or Gaussian, exponential or log normal, beta or spline, triangular, rectangular or trapezoidal, histogram, etc.

The five-term input, (X, Y, T, A, B), may be appropriate for Normal, Gaussian, Log normal and exponential distributions where the distribution can be described using two teens, A and B, where these two terms could represent mean and standard deviation, P10 and P90, P1 and P99, P50 and P90, etc. The six-term format, (X, Y, T, A, B, C), may be appropriate for spline, beta and triangular distributions, where the A, B and C terms could represent minimum, mode, and maximum values. Trapezoidal, histogram and other distributions may require more complicated input formats.

Whether the input data to the probability mapping system represents discrete data or data in the form of probability distributions, the input data may be known only for certain specific locations within an area of interest. Away from these certain locations, measured or known input data would be unknown.

Various types of discrete data may be used as input to the disclosed probability mapping system. For example, from the oil and gas industry, discrete input data may include reservoir sandstone thickness, net to gross ratios, porosity, permeability, water saturation, hydrocarbon saturation, mineral concentration or percentages, among others. In the environmental industry, discrete input data may include ground water contamination, contaminant concentration or percentages, lead concentration, copper concentration, arsenic concentration, hydrocarbon concentration, mercury concentration, soil contamination, among others. In the field of oceanography, discrete input data may include water temperature, water salinity, depth, etc. In the field of meteorology, discrete input data may include pollution percentages and types, temperature, rainfall, wind speed, humidity, etc.

Input data in the form of a probability distribution may be similarly varied. For example, input data in the form of a probability distribution may be provided to the probability map generating system for any of the above examples of discrete input data types where there are known or assumed errors in the measurement that can be expressed in terms of a probability function or where the data points constitute averages, such as average temperature, average porosity, average rainfall, etc.

Input data may be provided to the input mapping system by any suitable method. For example, input data may be tabulated in predetermined templates stored in memory and accessible to the processing system. Input data may be scanned into electronic form and stored. The input data may be provided via a graphical user interface, ASCII flat files, Excel spreadsheets, text files, relational databases, or any other suitable electronic process or format. Various optical character recognition utilities may be used to process or condition the input data.

In embodiments where the probability mapping systems include map-generating software configured to operate in conjunction with other software applications, as an add-on to other software applications, and/or as an embedded feature to other software applications, input data to the probability map generating system or software may be delivered fully or partially through those other software applications. For example, various software-based mapping packages (e.g., ArcView, Petrel, Kingdom, Zmap, CPS3, etc.) include dedicated databases for managing data. Such databases allow for maintenance and processing of data in a manner especially suited to the mapping packages that use the data. Data can be optimized, sorted, and quickly delivered to various components of the mapping package, as needed. The presently disclosed probability map-generating systems may be configured to leverage and take advantage of preexisting database management facilities of other software packages.

Figure 2:
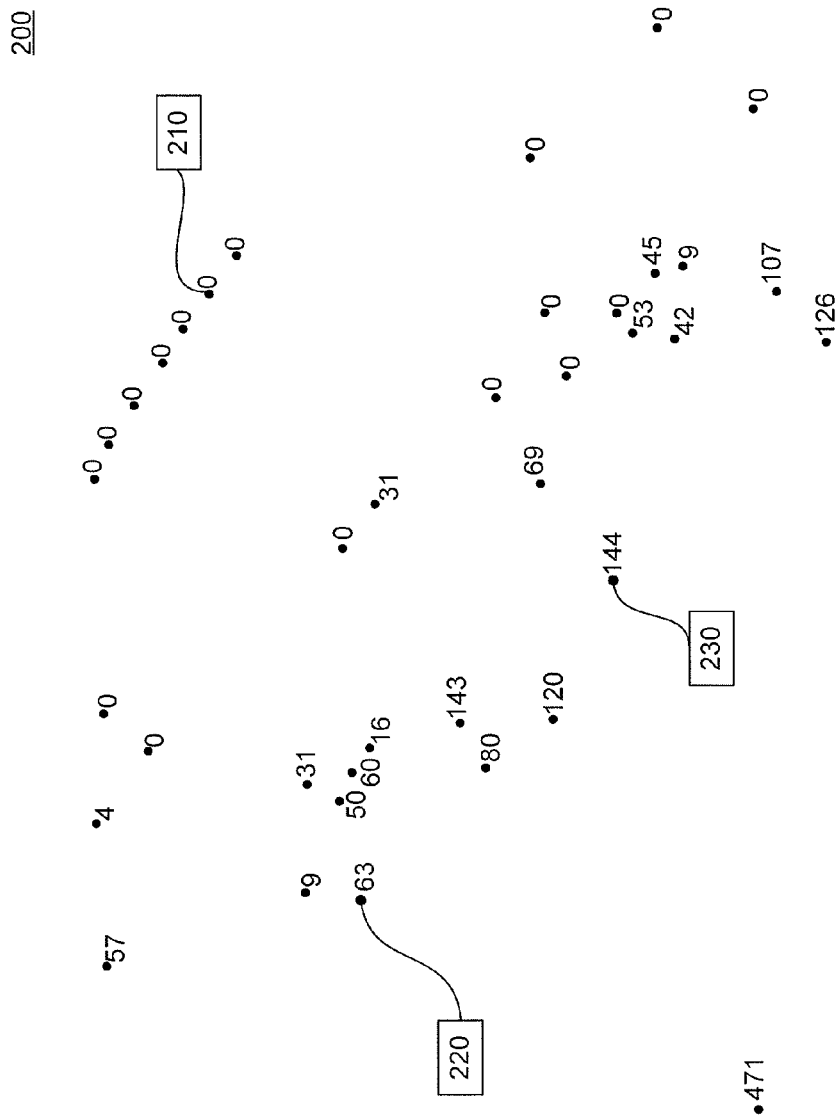
FIG. 2 provides an example set of input data for a quantity to be mapped over an area of interest.

FIG. 2 provides a graphical representation of an example set of input data 200 for a quantity to be mapped over an area of interest. In this example, input data 200 may be represented in the X, Y, Z format. The X and Z parameters provide a geographic reference point, such as a spatial location within an area of interest. The Z parameter associates a measured value for a quantity with the geographic reference point specified by the X and Y parameters. The Z parameter may be used to capture values for many different types of quantities, as previously described. In one example relevant to the oil and gas industry, the Z parameter may be used to record values associated with sub-surface formation thickness. Such Z parameter values may be represented, for example, by annotating a particular X, Y point with a particular thickness value. In this example the area of interest could include an oil field under consideration for exploration. The dimensions of the area of interest in an oil exploration example may be on the order of hundreds of meters to multiple kilometers.

Returning to the specific example shown in FIG. 2, input data 200 includes a plurality of measured values each associated with a different location within an area of interest. The X and Y parameter values determine where the points are placed on the map representative of the area of interest. These map locations may indicate, for example, where individual measurements were taken. The numbers shown next to the points on the input data map provide the value of the measured quantity at the particular X, Y location. For example, continuing with the formation thickness example, a measured formation thickness value of 0 feet is associated with location 210, a measured formation thickness value of 63 feet is associated with location 220, and a measured formation thickness value of 144 feet is associated with location 230.

Input data 200 provides a set of discrete locations were values for a particular quantity are known. Input data 200, on its own, however, provides no indication of the values for the particular quantity at locations within the area of interest other than at the known data point locations. Thus, in order to create a contour map filling in these gaps, an algorithm may be used to interpolate between the known data points and assign values to the quantity for points in the gaps between the known data points.

Any suitable algorithm or mapping software may be used to generate a grid or contour map showing known and estimated values over an entire area of interest. In some embodiments, a gridding algorithm may be used. Such gridding algorithms set a grid and grid size over the area of interest and, based on the known data points within the area of interest, calculate values for a particular quantity at each of the nodes of the grid.

In most cases, generating a contour map involves a step of selecting an area of interest. The area of interest essentially corresponds to the area to be mapped. This area will have a certain size determined by its dimensions, boundaries, etc. For example, a biologist studying ants may wish to map an ant hill. In this case, the area of interest may have dimensions of only a few centimeters. A home owner planning a new garden may wish to map her back yard, and there, the area of interest may have dimensions on the order of a few tens of meters or maybe hundreds of meters. A cartographer wishing to produce a map of the entire United States would have an area of interest with dimensions on the order of thousands of kilometers.

Another step in the generation of a contour map may include selection of a grid and corresponding grid size. A grid may correspond to an internal computer representation of the surface being mapped. In some embodiments, the grid may be defined in terms of Cartesian coordinates, but any other suitable grid definitions may be used. Two primary factors may influence the selected grid size. These include the size of the features being mapped and degree of distribution of the input data. According to sample theory principles, the sample rate should be one half of the smallest feature to be mapped. Therefore, a biologist mapping an ant hill may select a grid size on the order of millimeters. The home owner mapping her back yard may select a grid size on the order of meters or decimeters. The cartographer mapping the United States may select a grid size on the order of kilometers or tens of kilometers.

Data distribution may be another factor to consider when selecting a grid size for a mapping algorithm. In some embodiments, the selected grid size may be less than half the distance between the closest data points. Where a grid size is selected that is larger than one half the distance between the closest points, the possibility would exist that one or more data points could fall within a single grid cell and become smoothed. It should be noted that in view of the ever-increasing computing power of modern processors, these processors are better equipped than older processors to handle calculations for large numbers of grid nodes. Thus, unlike processors of the past that could take hours or days to complete the computations required for a small selected grid size, modern processors can perform many thousands or millions of computations in fractions of a second. Thus, to minimize the risk of data point clustering or aliasing the features to be mapped, it may be prudent to err on the side of selecting a smaller grid size.

Once the grid and its size parameters have been selected or assigned, the next step in generating a contour map of values may include determining and assigning values to each node in the grid. This process may include interpolation and/or extrapolation between known data points. In general, at nodes that coincide with or are very close to known data points, the values assigned to those nodes may be the same as or very close to the values of the known data points. Away from the known data points, however, values must be assigned to the nodes through interpolation or extrapolation, for example. Many algorithms are available for performing this type of interpolation or extrapolation, and each may have certain advantages or disadvantages depending on the requirements of a particular application. For example, different algorithms may be based on different sets of assumptions regarding how the input data should be interpolated or extrapolated. One common feature with these interpolation or extrapolation algorithms is that all may be used to calculate and assign values to the grid nodes away from the known input data points.

After assigning values to the grid nodes, the grid values may be contoured, and an output map may be generated. This output map may be shown on a display screen (e.g., a screen associated with a computer monitor, television, tablet computer, smart phone, cell phone, etc.), printed on paper or other media, stored in memory, etc. Alternatively, the grid may be used directly without conversion to contours for display as a three-dimensional surface, color coded surface, shaded relief surface, etc. The grid may also be used as input for further calculations or processing.

Various types of algorithms may be used to determine and assign values to the nodes on the grid. Broadly speaking, such algorithms may be divided into two broad classes: local interpolation algorithms and global extrapolation algorithms. In general, local interpolation algorithms may focus on a localized collection of data points and interpolate values between them. In most or even all cases, the calculated value for a particular node on the grid will not exceed the values of the surrounding input data. Some examples of local interpolation algorithms include triangulation, natural neighbors, moving average, inverse distance, kriging, and parabolic fitting, and collated co-kriging, among others.

In general, global extrapolation algorithms tend to examine the available data and attempt to provide a global solution, most commonly through progressive refinement. In global extrapolation algorithms, it is not uncommon for values assigned to grid nodes to exceed input data values. Some examples of global extrapolation algorithms include cubic B-Spline function, minimum curvature, full tension, convergent gridding, and cos expansion, flex gridding, and gradient projection, among others.

Figure 3:
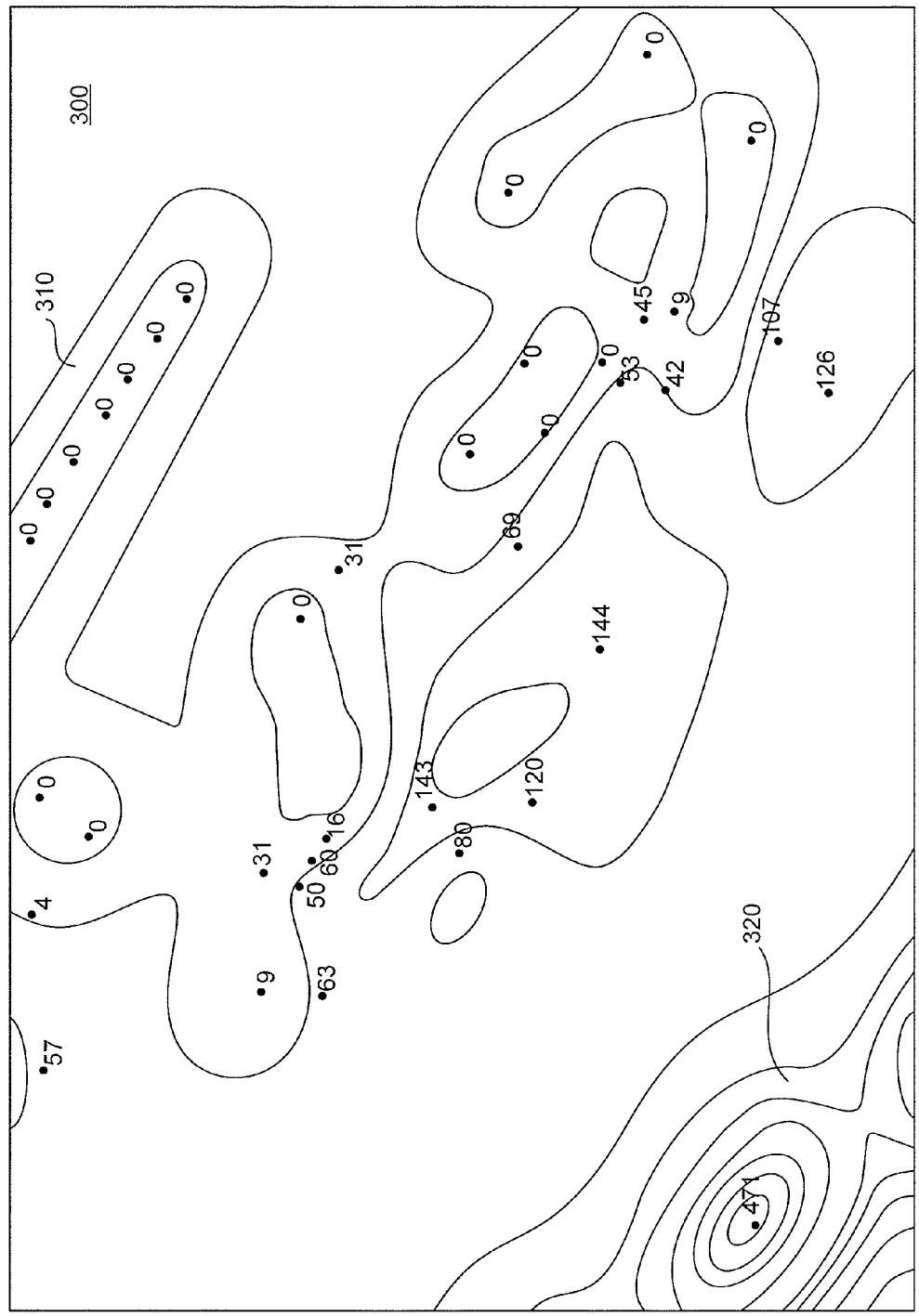
FIG. 3 provides an exemplary map of quantity values over an area of interest.

FIG. 3 provides an example of a contour map 300 that was generated based on input data 200. In this example, a grid and grid size were assigned, and the nodes on the grid were populated with values using a kriging algorithm. Input parameters to the kriging algorithm included a semi-major axis, a semi-minor axis, and an azimuth value. For the contour map 300 shown in FIG. 3, the parameter values selected were, as follows: a semi-major axis of 3577; a semi-minor axis of 2322; and an azimuth value of −27. Units have been omitted as the mapping technique is applicable for any selected units.

Based on the known data input values 200, which in this example represent formation thickness values within an area of interest, the kriging algorithm, and the specified parameter values for the kriging algorithm, data values were calculated for each node of the grid. These calculated values provide the basis for contour map 300. Each of the contour lines on map 300 indicates those locations within the area of interest where the formation thickness has a constant value. The gradient of the formation thickness in a certain region of the area of interest can be determined by looking in a direction perpendicular to the contour lines. The spacing of contour lines indicates the magnitude of the gradient in the data (or how rapidly the formation thickness changes within a particular region). As shown on map 300, region 310 corresponds to a valley in the area of a plurality of known data points all having a zero thickness. In contrast, region 320 shows an area of generally concentric contour lines surround a know data point having a thickness value of 471 feet. The relatively close spacing between the contour lines in the area suggests that the thickness in this region has a local maximum and falls off fairly rapidly to lower values.

Contour map 300 may provide useful information regarding the potential values associated with a quantity of interest away from the known data points. More information is needed, however, to provide additional information regarding probabilities associated with the values of the quantity over the area of interest.

To generate probability maps, the presently disclosed systems may make use of stochastic or Monte Carlo techniques. Specifically, rather than calculating only one contour map, such as contour map 300, based upon a unique set of input parameters to the gridding algorithm, the presently disclosed probability map generating systems may be configured to vary the input parameters and generate a contour map for each variation of the input parameters to the gridding algorithm. In this way, the probability map generating systems can generate a statistically significant number of contour maps (e.g., 50, 100, 200, or more) from which a statistically robust probability map may be generated.

The input parameters to the gridding algorithm can be varied according to any suitable stochastic or Monte Carlo based process. In some embodiments, the input parameters may be randomly varied by using a random number generator, for example. The input parameters may also be varied according to a predetermined probability function. A variation of the input parameters may involve variation of only a single parameter value, a portion of the available parameter values, or all of the available parameter values. The process of iteratively modifying at least one input parameter associated with the mapping algorithm may continue until any desired number of maps of values (contour map, raw data, or otherwise) has been generated. Depending on the particular gridding algorithm used, the input parameters that can be varied may include a radius of influence, anisotropy, azimuth, semi major and semi minor axis, and the sill and nugget in the case of kriging. Each contour map generated as a result of a variation to the input parameters to the gridding algorithm represents one possible distribution of the values of the quantity of interest between the discrete, known data points.

Figure 4:
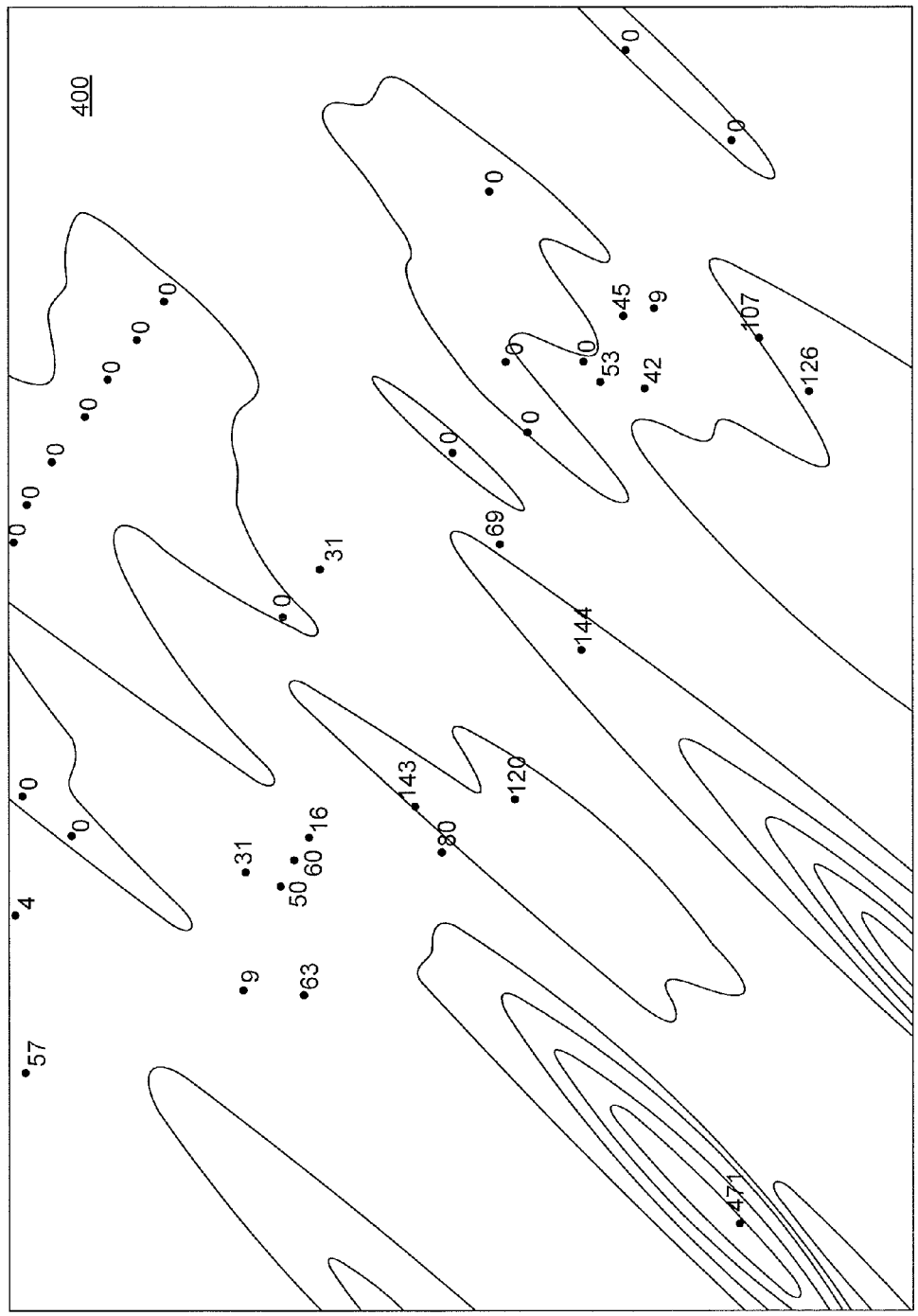
FIG. 4 provides an exemplary map of quantity values over an area of interest.

FIG. 4 shows a contour map 400 generated by modifying the input parameter values of the gridding algorithm used to generate map 300 shown in FIG. 3. Specifically, rather than using a semi-major axis of 3577; a semi-minor axis of 2322; and an azimuth value of −27 as input to the gridding algorithm (i.e., the input parameter values used to generate map 300), these input parameter values were modified to generate map 400. In the case of map 400, a semi-major axis of 8838; a semi-minor axis of 1040; and an azimuth value of 46 were used. While the underlying set of known data points remains unchanged, map 400 has significant differences as compared to map 300. As previously noted, this process can be repeated until any number of data sets or contour maps have been generated.

Figure 5:
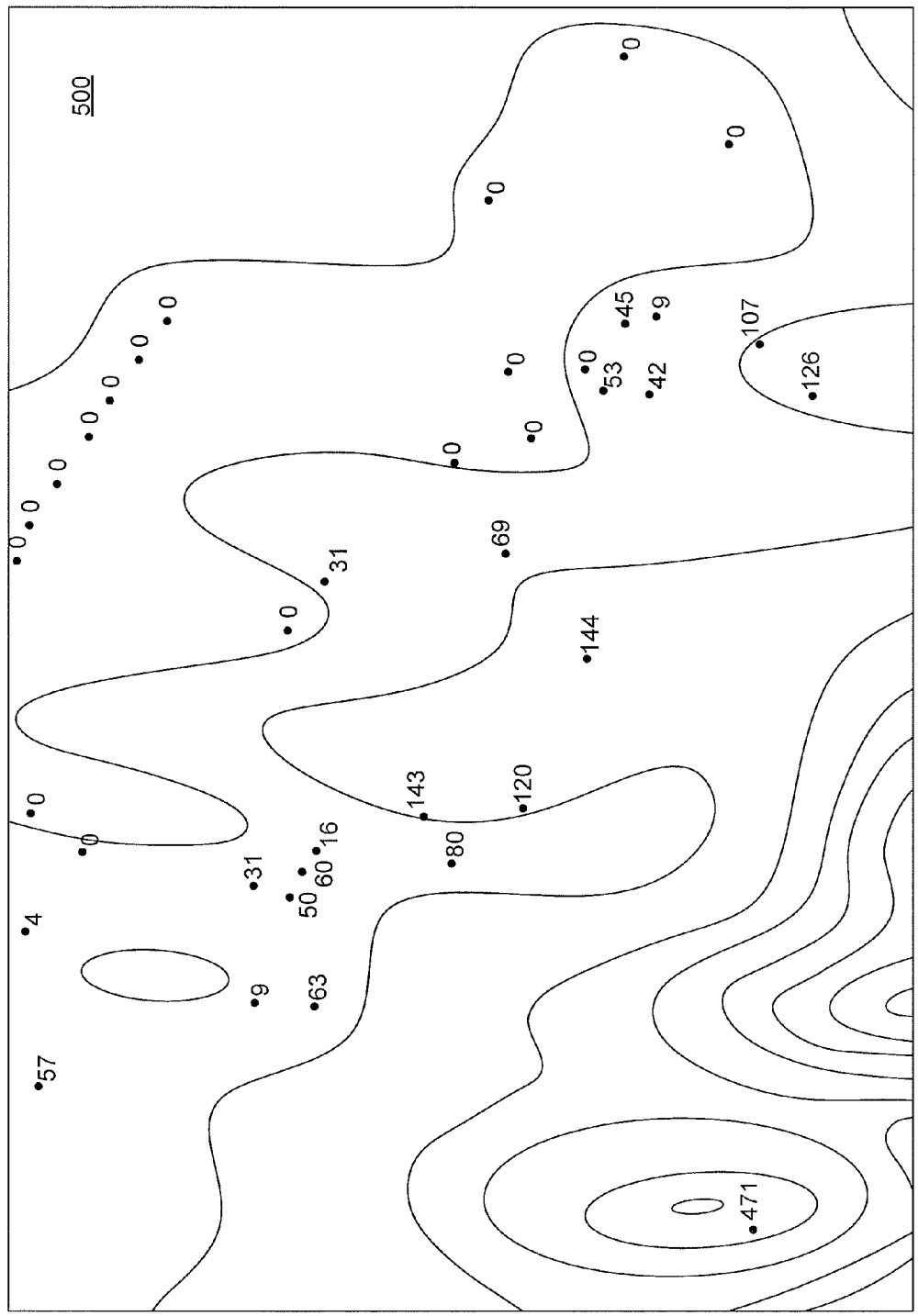
FIG. 5 provides an exemplary map of quantity values over an area of interest.

FIG. 5 shows another contour map 500 generated by modifying the input parameter values of the gridding algorithm. In the case of map 500, a semi-major axis of 8031; a semi-minor axis of 2779; and an azimuth value of 86 were used.

As previously indicated, an important aspect of the presently disclosed embodiments is the use of stochastic or Monte Carlo techniques to vary the parameters of the gridding algorithms to obtain a statistically significant sample of possible maps. Different gridding algorithms, however, may use different parameters depending on the particular estimation techniques employed by the gridding algorithm. Further, different gridding algorithm venders may implement the algorithms differently and limit the extent to which the parameters may be varied. Finally, some gridding algorithms, such as triangulation and the natural neighbor algorithms, may be less suitable than others for the type of parameterization necessary in making multiple estimations.

Despite potential differences among the various gridding algorithms, many commonalities may exist. For example, the concept of search radius and anisotropy may be applicable across multiple gridding algorithms. The moving average gridding algorithm, which is a relatively simple gridding algorithm, can be used to illustrate how modifying the search radius and anisotropy can be used to generate multiple versions of a map from the same input data.

To generate data maps, known data points may be used to populate the nodes of a grid that covers the area of interest. For each node on the grid the gridding algorithm may look for those data points that fall within the search radius and then assign to that grid node the average of those known data points. By varying the size of the search radius the number of data points that are averaged can be changed, the values assigned to the grid nodes can be changed, and, therefore, the final grid and resulting map may be changed.

Additional variation may be achieved by introducing anisotropy. A simple search radius implies a circle, but frequently the use of an ellipse may yield better results. By defining an aspect ratio, or a semi major and semi minor axis, the circle may be converted to an ellipse. An ellipse with an aspect ratio of 0.5 would have a semi major axis twice as long as the semi minor axis. The ellipse may also be oriented north-south, east-west, or any other desired direction. By changing the size, aspect ratio and orientation (or azimuth) of the ellipse, the data points that are averaged may change. As a result, the values of the grid nodes may change and, therefore, the grid and final map may be changed. In this way, iterative variation of the input parameters can lead to multiple, different maps being generated based on the same input data.

Various types of parameters can be varied depending on the particular gridding algorithms used. For example, search radius and anisotropy can be used with most local interpolation algorithms. The inverse distance algorithm has a decline rate parameter that may be varied. The kriging algorithm allows for variation in the "sill and nugget" parameters. Regarding global extrapolation methods, most, if not all, allow for variation in the anisotropy, as well as other parameters unique to the specific algorithms. For example, in the minimum curvature algorithm, the curvature constraint may be relaxed, while in the full tension algorithm, the tension constraint may be relaxed.

All of the above noted algorithms generate grids which can then be displayed as contour maps (either paper or computer displayed), color graded displays, or three dimensional surfaces in computer graphics. These grids may also be output to ascii or binary files for import, display, and/or manipulation by other programs. In some embodiments the generated grids may be produced to comply with certain industry standard formats, such as CPS-3, EarthVision, Irap (ascii) and Irap (Binary), Petrel and Zmap+, among others.

As a further note regarding the stochastic processes associated with the disclosed embodiments, almost all programming languages include one or more random number generators. In the simplest form, the random number generator can be used to generate numbers between two specified end-members. As noted previously, one of the most common parameters that can be varied, and perhaps the best way to implement stochastic variation, is the use of anisotropy. One implementation of anisotropy uses semi major axis, semi-minor-axis, and azimuth. Using this as an example, reasonable ranges for these parameters (depending on the size of the area of interest and data distribution) might be between 1000 m and 10,000 meters for the axis and 0 to 180 degrees for the azimuth. The random number generator can then be set to output numbers between the noted end-members, and those numbers can then be used as variants to the input gridding parameters.

Another approach may be to constrain the random number generator by a probability function or histogram. Using the semi-major/semi-minor axis example above, the lengths of these axes could reasonably vary between 1000 m and 10,000 m, with a likely length of 4,500 m. If the p99 is at 1000 m and the P01 is at 10,000 m, the distribution can be described as a normal or Gaussian probability distribution. This probability function can then be replaced by a histogram where the number of classes in the histogram may be based on the number of iterations planned (or the number of times the maps will be generated). Each time the system goes through an iteration, the histogram may be interrogated to determine the class to which the number produced by the random number generator belongs. If the number generator produces a number that belongs to a class in the histogram that has already been filled, the number may be rejected, and a new number may be output. In this manner, new numbers may be generated for the gridding algorithm until the histogram is filled.

While the processes described above for generating data sets and/or data maps focused on varying the input parameters to gridding algorithms, other techniques may also be employed for providing data sets and/or data maps. For example, as an alternative to, or in addition to variation of the gridding algorithm input parameters, data sets and/or data maps may also be generated by varying the data provided as input to the gridding algorithm, among any other suitable techniques. Varying the input data may include varying the values associated with the known data points used to populate the nodes of a grid covering an area of interest. One or more selected gridding algorithms may be run using any or all of the varied input data sets in order to generate data sets and/or data maps corresponding to the area of interest.

The input data to the gridding algorithm can be varied according to any suitable stochastic or Monte Carlo based process. The input data may be randomly varied by using a random number generator, for example. The input data may also be varied according to a predetermined probability function (e.g., gaussian, or any other suitable probability distribution function). A variation of the input data may involve variation of only a single data value, a portion of the available data values, or all of the available data values. The process of iteratively modifying input data provided to a mapping algorithm may continue until any desired number of maps of values (contour map, raw data, or otherwise) has been generated. Such stochastic or Monte Carlo techniques to vary the input data provided to the gridding algorithms can be used to provide a statistically significant sample of possible maps from which a one or more probability maps may be generated. Once a desired number of data sets or maps has been obtained, the process of producing a probability map can continue. Any suitable technique for calculating probability information based on the generated data sets or maps may be used. In some embodiments, the generated data sets or maps may be averaged together. Other techniques for calculating probability information based on the generated data sets or maps may also be used alone or in combination with any other suitable techniques. For example, such probability information may be generated by determining a median, mean (average), mode, range, variance, deviation, standard deviation, skewness, kurtosis, etc. based on the generated data sets or maps. Alternatively, or additionally, the generated data sets or maps may be converted to binary data sets or maps. This conversion may involve comparing values in the generated data sets or maps to a predetermined threshold value. Values in the data set or map that equal or exceed the predetermined threshold value, for example, may be assigned a new value of one, and values that fall below the predetermined threshold value may be assigned a value of zero. In this way, a binary map may be generated for each of the data sets or maps generated as part of the input parameter variation process.

The predetermined threshold value can correspond to any suitable value depending on the requirements of a particular application. In some embodiments, the threshold value may correspond to a value for the quantity of interest identified as having a particular economic significance etc. For example, in the oil and gas exploration example, the threshold value may correspond to a particular formation thickness (e.g., 10 feet or other thickness of interest) used to determine whether to establish a drilling operation. In the agricultural industry, the threshold value may correspond to a particular rainfall amount.

Figure 6:
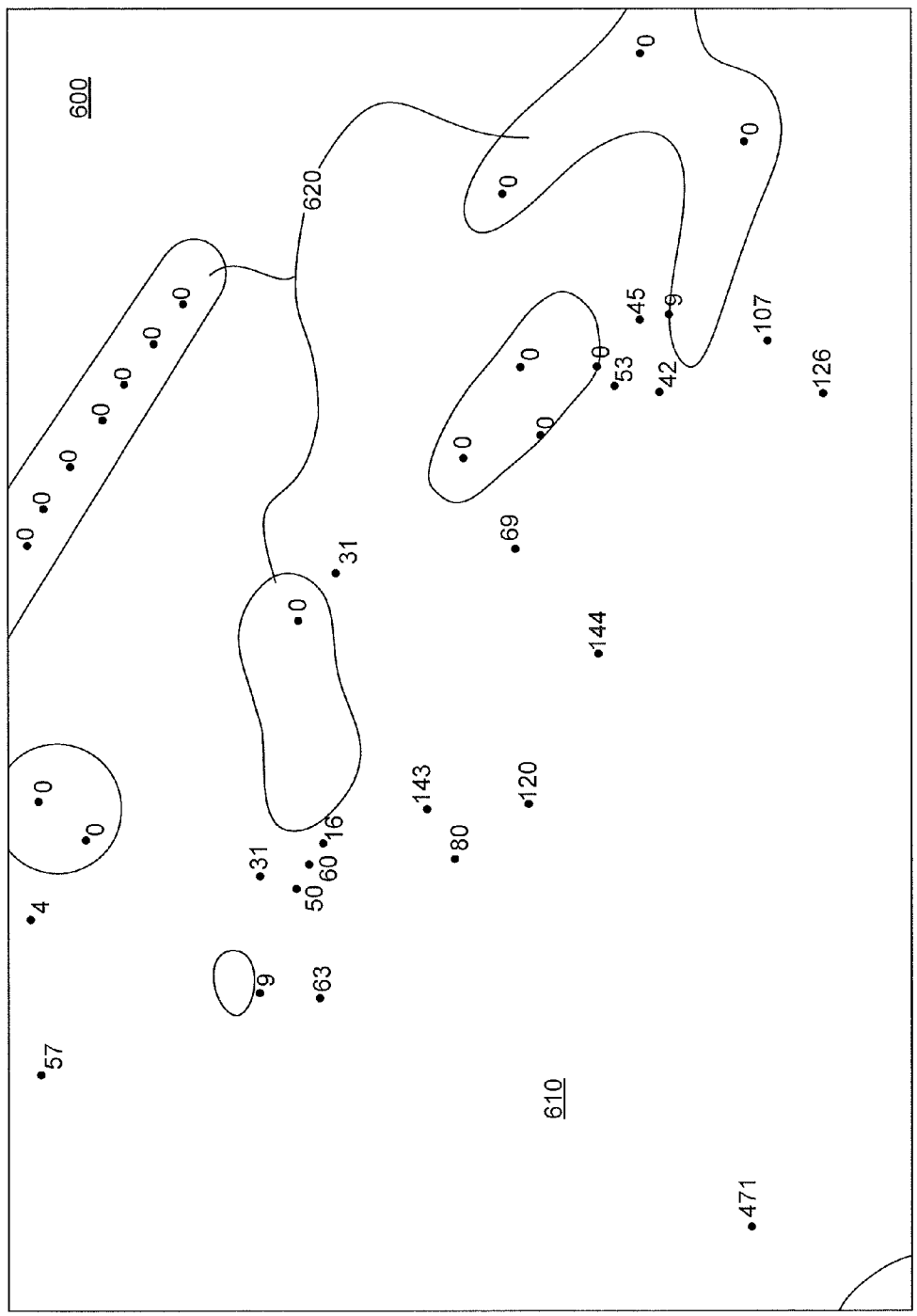
FIG. 6 provides an exemplary binary map of quantity values over an area of interest.

FIG. 6 shows a binary map 600 generated based on map 300 of FIG. 3. In this example, the predetermined threshold value selected was 10 (e.g., 10 feet of thickness in the sub-surface formation). To generate map 600, the values assigned to the grid associated with map 300 were compared with respect to the predetermined threshold. For each node on the grid that had a value of 10 or more, that value was replaced with a value of 1. For each node on the grid that had a value less than ten, that value was replaced with a value of 0. The resulting contour map identifies those regions, such as region 610, expected to have a formation thickness equal to or greater than 10 feet. Map 600 also identifies those regions, such as regions 620, expected to have a formation thickness less than 10 feet. As shown on map 600, each of the known data points having a value of zero falls within one of the regions expected to have a formation thickness less than 10.

Figure 7:
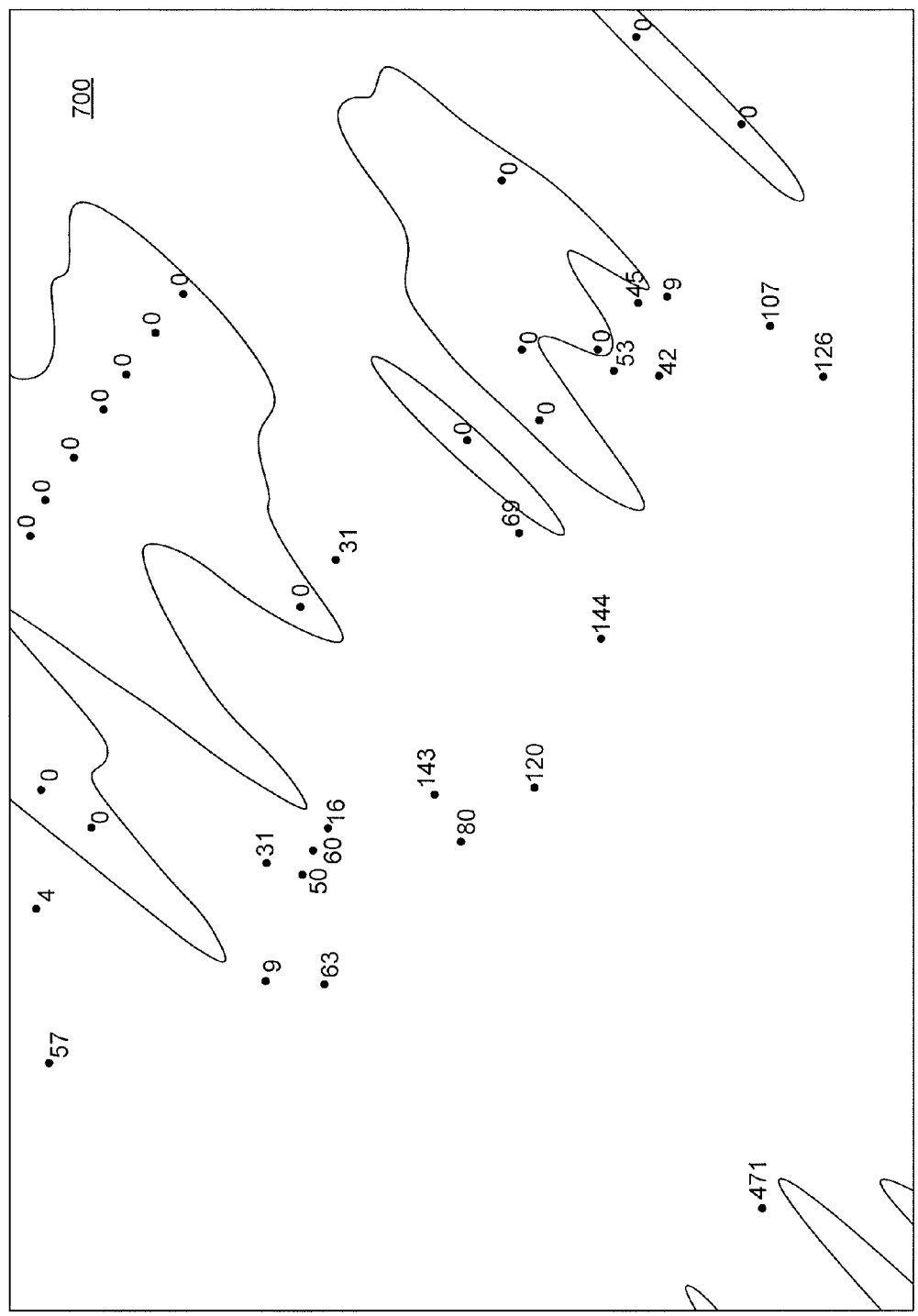
FIG. 7 provides an exemplary binary map of quantity values over an area of interest.
Figure 8:
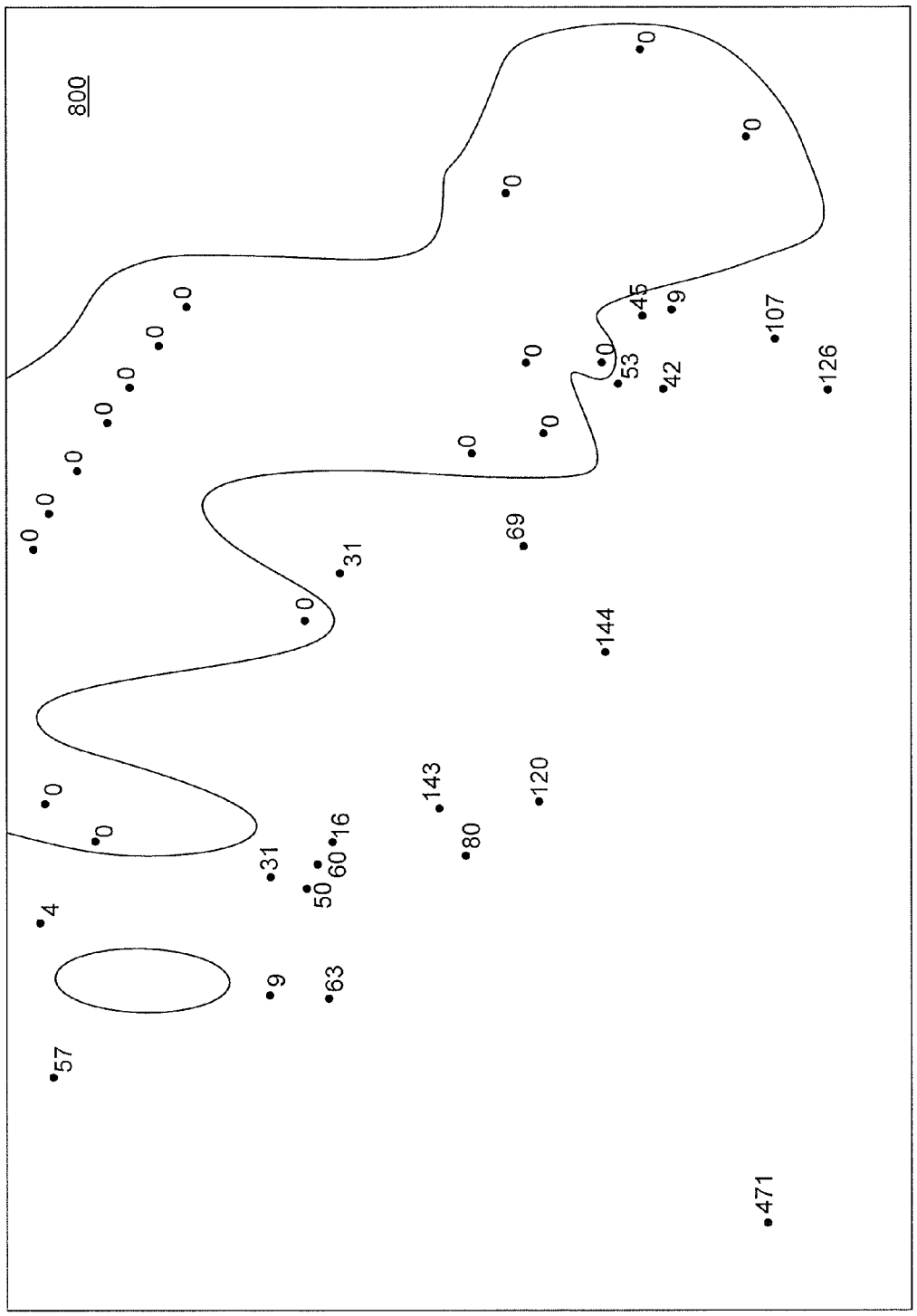
FIG. 8 provides an exemplary binary map of quantity values over an area of interest.

FIG. 7 and FIG. 8 provide binary maps 700 and 800, respectively. Map 700 represents a binary map generated using map 400, shown in FIG. 4, and a predetermined threshold value of 10. Map 800 represents a binary map generated using map 600, shown in FIG. 5, and a predetermined threshold value of 10.

Probability maps can be generated based on any number of binary grids, such those for maps 600, 700, and 800. In some embodiments, values associated with corresponding nodes of 10, 50, 100, 200 or more binary grids may be averaged to provide a probability grid. From this probability grid a probability contour map can be generated to show the probability that any point away from a known data point has a value above the predetermined threshold value.

Figure 9:
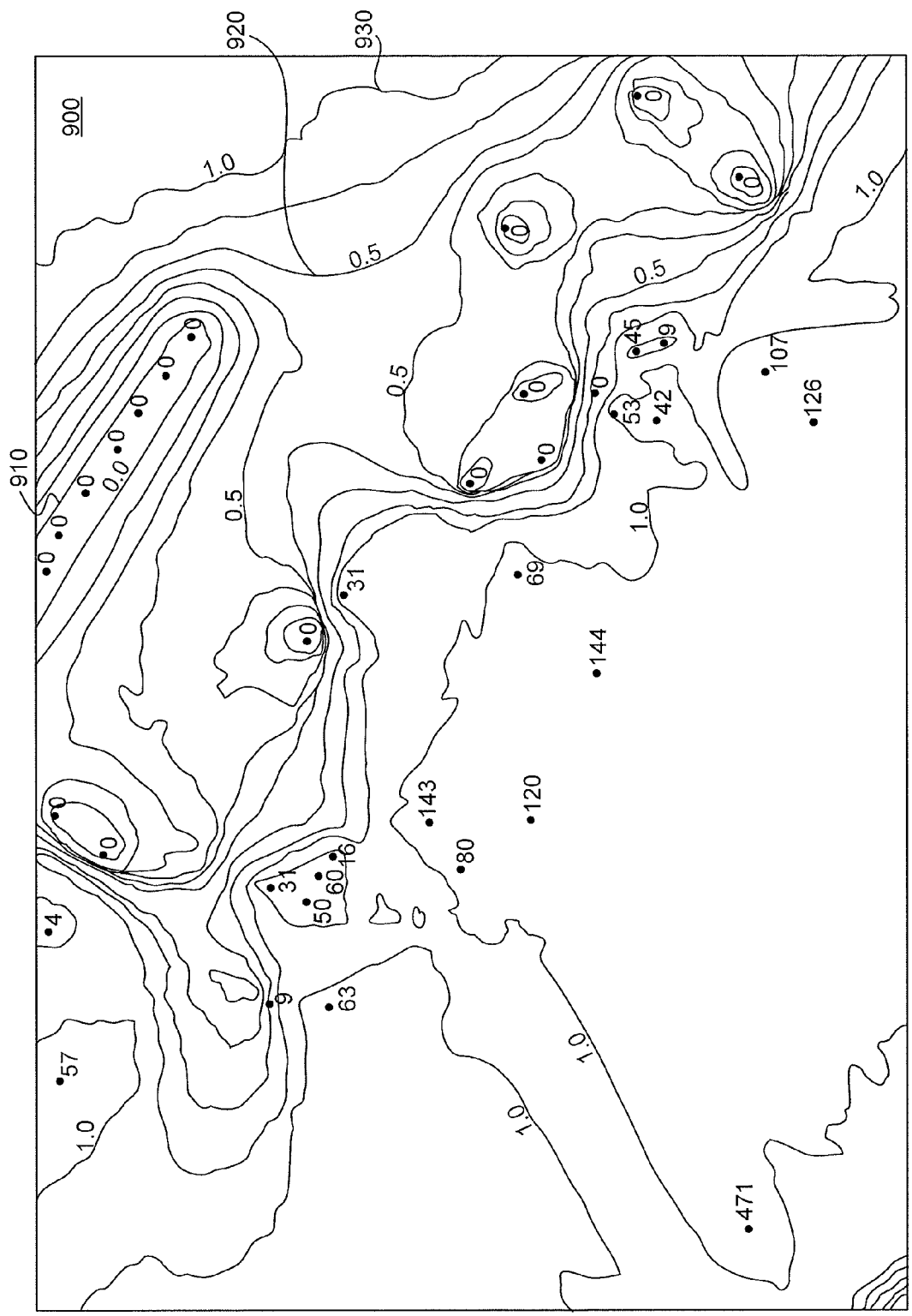
FIG. 9 provides an exemplary probability map generated in accordance with the exemplary disclosed embodiments.

FIG. 9 shows a probability contour map 900 generated by averaging together binary maps, including binary maps 600, 700, and 800, among many others. In the example shown in FIG. 9, map 900 shows the probability for all points over an area of interest that a sub-surface formation has a thickness of 10 feet or greater. The probability data is represented using contour lines. For example, contour line 910 represents locations within the area of interest where there is a calculated 0% probability that the formation thickness is greater than 10 feet. Contour line 920 represents locations within the area of interest where there is a calculated 50% probability that the formation thickness is greater than 10 feet, and contour line 930 represents locations within the area of interest where there is a calculated 100% probability that the formation thickness is greater than 10 feet. All grid values between known data points will vary between 1.0 and 0.0 (or 100% and 0%).

In addition to the probability map shown in FIG. 9, which maps probabilities from 0 to 1.0, many other types of probability maps may be generated consistent with the disclosed embodiments. For example, in some embodiments, probability maps may be generated based on discrete data points that represent the values of an attribute occurring continuously across a surface. The values of that attribute may be unknown between the selected discrete data points and values for the data points range between 0 and 100. There may be an interest in generating a pX grid or map (e.g, a p90 grid or map that shows where there is a 90% probability that actual values will exceed those mapped and a 0.1 or 10% probability that actual values will be less than those mapped.

To generate the probability map in this example, a gridding algorithm may be selected that will interpolate between known data points and allow for modification of gridding parameters. Examples of such gridding algorithms include kriging and minimum curvature, among others, as discussed above. A statistically significant number of grids (e.g., >100) may then be generated using stochastic or Monte-Carlo techniques to vary the gridding parameters either randomly or according to a probability function. Parameters that may be varied include radius of influence, anisotropy, azimuth, semi major and semi minor axis, and in the case of kriging the sill and nugget. Each resulting map represents one possible distribution of the attribute between discrete data points. Each of the maps generated (or at least a subset of the maps generated) may be averaged. The resulting grid and contour map will show the mean or P50 map (assuming a normal distribution). The P50 map is one where for any point between known data points, there is a 50% probability that actual values will exceed those mapped and a 50% probability that actual values will be less than those mapped. Based on the maps generated by varying the input parameters of the gridding algorithm, a standard deviation map can be generated and multiplied by 1.6. If this standard deviation map is subtracted from the P50 map, the resulting map is a P90 map in which where these is a 90% probability that actual values will exceed those mapped and a 10% probability that actual values will be less than those mapped.

Still other examples exist for generating probability maps in accordance with the disclosed embodiments. For example, there may be an interest in generating a map that shows a P50 or mean distribution of data that are not discrete, but have a probability distribution associated with them. The probability distribution may be due to errors in measurement or because the data represent averages (i.e. average rain fall, average age, etc.). A probability distribution may be assigned to each data point in a particular set of data points that can be mapped. The probability distribution may be the same for each data point or may be different. A statistically significant number of data sets may be generated based on the assigned probability function for each of the data points and by using a gridding algorithm and stochastically varied input parameters. Averaging the grids or maps generated will result in a map that represents an average or P50 probability map (assuming a normal distribution).

Once the probability maps have been generated, they may be subjected to a variety of post processing techniques. Many gridding algorithms may produce artifacts that result is maps that have "rough" looking contours and/or spikes. Therefore, in some embodiments, the probability maps may be subjected to processes for de-spiking and smoothing. Other common post processing tools may include dip and azimuth, which provide information on the rate of change and the direction of change.

An important aspect in generating probability maps is to have a statistically significant number of valid maps that can be used for statistical analysis. The implicit assumption is that varying the parameters of the gridding algorithm between scientifically reasonable end members while holding the input data constant (or varying the input data between statistically reasonable end members) will provide a statistically significant number of valid maps.

As previously discussed, generation of a statistically significant number of maps may be accomplished using stochastic or Monte-Carlo techniques to vary the parameters of a gridding algorithm. The system may be initiated with a preset number of maps (e.g., 100, etc.). Each time a new map is generated, a random number generator may be used to provide new input numbers for the gridding parameters. In this way, the system will generate 100 different unique maps.

The presently disclosed probability map generating systems and methods may be applied in a multitude of industries and applications. Credit card companies may use this type of tool to evaluate the probability that customers in certain geographic regions will pay for purchases or the risk that customers in other geographic regions will default on payments. Banks share similar concerns regarding loans. Investors may be interested in the probability that certain investments will be profitable weighed against the risk of loss. Insurance companies analyze probabilities associated with life span, health costs, driver safety, risks of injury, etc. These industries and many others can use the probability mapping techniques to generate and analyze data based on a set of known data points.

The oil and gas exploration industry may also benefit from the presently disclosed probability map generating systems and methods. In this industry, only about one in eight, or about 12.5% of all exploration wells are successful. Many programs have been developed to help manage exploration and drilling risk. These programs generally work in a similar way by estimating probabilities associated with factors that affect the accumulation of hydrocarbons, including but not limited to source, reservoir, seal, and structure are input into the system. These programs may use Bayesian and/or Monte-Carlo statistical techniques to estimate the probability of success or risk of failure.

Such systems, however, rely on input that can be qualitative, which can affect the usefulness of the probability information generated from this input. Much of the qualitative input is derived from expert opinion. Therefore, the final probability or risk output from these systems may be only as good as the experts' opinions. The presently disclosed systems and methods provide a technique for quantifying some of the input parameters used in generating probability maps. This approach may yield probability data less susceptible to the quality of qualitative opinions.

The disclosed embodiments may be used in many applications within the oil and gas industry. For example, wells may be drilled at mapped locations indicating there is a 90% chance of encountering more than a certain thickness of oil-containing material (e.g., a sandstone formation). Insurance companies can use the disclosed embodiments to analyze the risk of flooding in certain localities based on soil permeability, rainfall probabilities, and/or groundwater runoff data. The environmental industry can determine probabilities that land is safe for habitation based on soil samples analyzed for levels of certain contaminants. These are just a few of many potential applications in which the disclosed embodiments may be employed. Meteorologists can create better and statistically valid average rainfall maps. Further, using the disclosed embodiments, maps of any statistical measure (e.g., mean, median, mode, variance, deviation, standard deviation, skewedness, etc.) can be generated, and various test of statistical significance can be conducted, including the generation of probability maps.

What is claimed is:

1. A processor-based system for generating a probability map, comprising:
   at least one processor configured to:
   receive a geo-spatially discrete input data set associated with a quantity to be mapped;
   generate a statistically significant number of maps of values for the quantity within an area of interest based on the geo-spatially discrete input data set, wherein generation of the statistically significant number of maps includes applying a processor-based mapping algorithm to generate an initial map of values for the quantity within the area of interest based on the geo-spatially discrete input data set, using a random number generator to iteratively modify one or more algorithm parameters associated with the mapping algorithm, and for each iterative modification of the one or more algorithm parameters, applying the mapping algorithm to the geo-spatially discrete input data set using the modified one or more algorithm parameters in order to generate an additional map of values for the quantity within the area of interest;

generate a probability map associated with the quantity based on the statistically significant number of maps by operating on the statistically significant number of maps.

2. The system of claim 1, wherein the at least one processor is further configured to operate on the statistically significant number of maps by converting each of the statistically significant number of maps to corresponding binary maps based upon a predetermined threshold value and then averaging the binary maps.

3. The system of claim 1, wherein operating on the statistically significant number of maps includes determining one or more of a median, mean(average), mode, range, variance, deviation, standard deviation, skewness, or kurtosis based on the statistically significant number of maps.

4. The system of claim 1, further including a display screen configured to display the probability map.

5. The system of claim 1, wherein the quantity includes at least one of geographic, topographic, bathometric, geologic, geophysical, petrophysical, oceanographic, metrological, atmospheric, hydrologic, pedologic (soil), chemical, environmental, sociologic, economic, biologic, zoological, botanical, epidemiologic, political, ecologic, reservoir engineering or mining data.

6. The system of claim 1, wherein the processor-based algorithm includes a local interpolation algorithm.

7. The system of claim 6, wherein the local interpolation algorithm includes a calculation based on at least one of triangulation, natural neighbors, moving average, inverse distance, kriging, parabolic fitting, or collated co-kriging.

8. The system of claim 1, wherein the processor-based algorithm includes a global extrapolation algorithm.

9. The system of claim 8, wherein the global extrapolation algorithm includes a calculation based on at least one of a cubic b-spline function, minimum curvature, full tension, convergent gridding, cos expansion, flex gridding, or gradient projection.

10. A computer readable storage medium having computer readable program code embodied in the medium for use by a processor-based system in generating a probability map, the computer readable storage medium comprising:
program code configured to:
receive a geo-spatially discrete input data set associated with a quantity to be mapped;
generate a statistically significant number of maps of values for the quantity within an area of interest based on the geo-spatially discrete input data set, wherein generation of the statistically significant number of maps includes applying a processor-based mapping algorithm to generate an initial map of values for the quantity within an area of interest based on the geo-spatially discrete input data set, using a random number generator to iteratively modify one or more algorithm parameters associated with the mapping algorithm, and for each iterative modification of the one or more algorithm parameters, applying the mapping algorithm to the geo-spatially discrete input data set using the modified one or more algorithm parameters in order to generate an additional map of values for the quantity within the area of interest; and
generate a probability map associated with the quantity based on the statistically significant number of maps by operating on the statistically significant number of maps.

11. The computer readable storage medium of claim 10, wherein the program code is further configured to operate on the statistically significant number of maps by converting the statistically significant number of maps to corresponding binary maps based upon a predetermined threshold value and averaging the binary maps.

12. The computer readable storage medium of claim 10, wherein operating on the statistically significant number of maps includes determining one or more of a median, mean (average), mode, range, variance, deviation, standard deviation, skewness, or kurtosis based on the statistically significant number of maps.

13. The computer readable storage medium of claim 10, wherein the quantity includes at least one of geographic, topographic, bathometric, geologic, geophysical, petrophysical, oceanographic, metrological, atmospheric, hydrologic, pedologic (soil), chemical, environmental, sociologic, economic, biologic, zoological, botanical, epidemiologic, political, ecologic, reservoir engineering or mining data.

14. The computer readable storage medium of claim 10, wherein the processor-based algorithm includes a local interpolation algorithm, which includes a calculation based on at least one of triangulation, natural neighbors, moving average, inverse distance, kriging, parabolic fitting, or collated co-kriging.

15. The computer readable storage medium of claim 10, wherein the processor-based algorithm includes a global extrapolation algorithm, which includes a calculation based on at least one of a cubic b-spline function, minimum curvature, full tension, convergent gridding, cos expansion, flex gridding, or gradient projection.

16. A method of generating a probability map, comprising:
receiving a geo-spatially discrete input data set associated with a quantity to be mapped;
generating a statistically significant number of maps of values for the quantity within an area of interest based on the geo-spatially discrete input data set, wherein generating the statistically significant number of maps includes applying a processor-based mapping algorithm to generate an initial map of values for the quantity within an area of interest based on the geo-spatially discrete input data set, using a random number generator to iteratively modify one or more algorithm parameters associated with the mapping algorithm, and for each iterative modification of the one or more algorithm parameters, applying the mapping algorithm to the geo-spatially discrete input data set using the modified one or more algorithm parameters in order to generate an additional map of values for the quantity within the area of interest; and
generating a probability map associated with the quantity based on the statistically significant number of maps by operating on the statistically significant number of maps.

17. The method of claim 16, wherein operating on the statistically significant number of maps includes:
converting the statistically significant number of maps to corresponding binary maps based upon a predetermined threshold value; and
averaging the binary maps.

18. The method of claim 16, wherein operating on the statistically significant number of maps includes determining one or more of a median, mean (average), mode, range, variance, deviation, standard deviation, skewness, or kurtosis based on the statistically significant number of maps.

19. The method of claim 16, wherein the quantity includes at least one of geographic, topographic, bathometric, geologic, geophysical, petrophysical, oceanographic, metrological, atmospheric, hydrologic, pedologic (soil), chemical, environmental, sociologic, economic, biologic, zoological, botanical, epidemiologic, political, ecologic, reservoir engineering or mining data.

20. The method of claim 16, wherein the processor-based algorithm includes a local interpolation algorithm.

21. The method of claim 20, wherein the local interpolation algorithm includes a calculation based on at least one of triangulation, natural neighbors, moving average, inverse distance, kriging, parabolic fitting, or collated co-kriging.

22. The method of claim 16, wherein the processor-based algorithm includes a global extrapolation algorithm.

23. The method of claim 22, wherein the global extrapolation algorithm includes a calculation based on at least one of a cubic b-spline function, minimum curvature, full tension, convergent gridding, cos expansion, flex gridding, or gradient projection.

24. The method of claim 16, further including displaying the probability map.

25. A processor-based system for generating a probability map, comprising:
at least one processor configured to:
receive a geo-spatially discrete input data set associated with a quantity to be mapped;
generate a statistically significant number of maps of values for the quantity within an area of interest based on the geo-spatially discrete input data set, wherein generation of the statistically significant number of maps includes applying a processor-based mapping algorithm to generate an initial map of values for the quantity within an area of interest based on the received geo-spatially discrete input data set, using a random number generator to iteratively modify the geo-spatially discrete input data set, and for each iterative modification of the geo-spatially discrete input data set, applying the mapping algorithm to the modified geo-spatially discrete input data set in order to generate an additional map of values for the quantity within the area of interest; and
generate a probability map associated with the quantity based on the statistically significant number of maps by operating on the statistically significant number of maps.

26. The system of claim 25, wherein the at least one processor is further configured to operate on the statistically significant number of maps by converting the statistically significant number of maps to corresponding binary maps based upon a predetermined threshold value and averaging the binary maps.

27. The system of claim 25, wherein operating on the statistically significant number of maps includes determining one or more of a median, mean(average), mode, range, variance, deviation, standard deviation, skewness, or kurtosis based on the statistically significant number of maps.

28. The system of claim 25, wherein the quantity includes at least one of geographic, topographic, bathometric, geologic, geophysical, petrophysical, oceanographic, metrological, atmospheric, hydrologic, pedologic (soil), chemical, environmental, sociologic, economic, biologic, zoological, botanical, epidemiologic, political, ecologic, reservoir engineering or mining data.

29. The system of claim 25, wherein the processor-based algorithm includes a local interpolation algorithm.

30. The system of claim 29, wherein the local interpolation algorithm includes a calculation based on at least one of triangulation, natural neighbors, moving average, inverse distance, kriging, parabolic fitting, or collated co-kriging.

31. The system of claim 25, wherein the processor-based algorithm includes a global extrapolation algorithm.

32. The system of claim 31, wherein the global extrapolation algorithm includes a calculation based on at least one of a cubic b-spline function, minimum curvature, full tension, convergent gridding, cos expansion, flex gridding, or gradient projection.

* * * * *